M. J. WELSH.
EARTH TREATING PROCESS AND PRODUCT
APPLICATION FILED JAN. 26, 1915.
1,159,450. Patented Nov. 9, 1915.
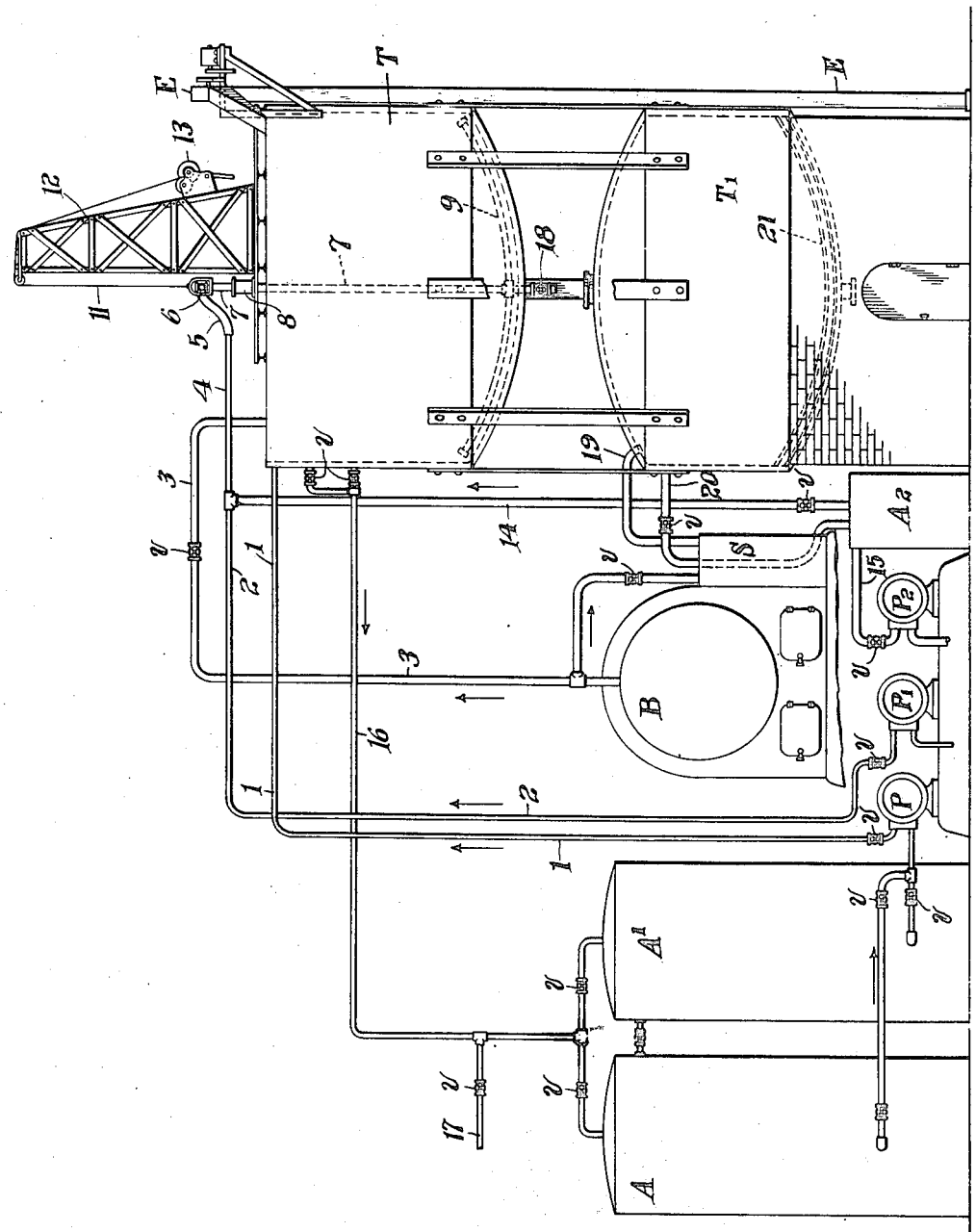

UNITED STATES PATENT OFFICE.

MICHAEL J. WELSH, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

EARTH-TREATING PROCESS AND PRODUCT.

1,159,450.  Specification of Letters Patent.  Patented Nov. 9, 1915.

Original application filed June 7, 1913, Serial No. 772,415. Divided and this application filed January 26, 1915. Serial No. 4,441.

*To all whom it may concern:*

Be it known that I, MICHAEL J. WELSH, a citizen of the United States, residing in the city of Philadelphia and State of Pennsylvania, have invented certain new and useful Improvements in Earth-Treating Processes and Products, of which the following is a specification.

My invention relates to the treatment of raw fullers' earth or other earth of similar properties or characteristics useful for filtering, decolorizing, purifying or otherwise acting upon fluid or liquid substances, such as oils in general, and particularly mineral or petroleum oils, melted paraffin or other wax, stearic acid, etc.

It is the object of my invention to so treat raw earth, and particularly raw fullers' earth, that is, earth which has not been preivously used for decolorizing, purifying, filtering or otherwise acting upon the aforementioned liquids or any of them, that the earth shall be put into such condition that it shall retain its useful properties for a longer period; or that a given amount of the material shall be enabled to filter, decolorize or purify greater quantities of fluid or liquid substance referred to before becoming spent or of no further practical value for these purposes or before becoming spent to such degree as to make it necessary or desirable to revivify or reclaim it, as described in my prior application Serial Number 772,415, filed June 7, 1913, of which this application is a division and continuation; or that it shall be put in such condition that it shall better withstand or otherwise improve it for further treatment after having been used upon fluid or liquid substances as described in my aforesaid application.

My invention resides in the improved earthy material herein described, and in the process of and apparatus for producing the same.

I shall take the treatment of fullers' earth for illustrative purposes and as the preferred form of my invention.

Florida fullers' earth, for example, is first dried, so that it may be granulated and screened to a range of sizes, such, for example, as will pass through a 15-mesh screen, but will not pass through an 80-mesh screen. This raw granulated earth is then transferred to a roasting or calcining kiln or furnace and heated until it attains a temperature sufficient to drive off the free moisture, and some of the water of constitution of the fullers' earth constituents. While initial drying followed by granulation is the usual and preferred procedure, the earth as it comes from the mine may be crushed and then treated in any of the ways hereinafter described. After this roasting or calcining treatment the earth is subjected to an aqueous solution of preferably mineral acid, such as sulfuric, nitric or hydrochloric acid, preferably at the boiling temperature. And while so in contact with the acid the mass is preferably stirred or agitated. After such acid treatment for a suitable length of time, the aqueous solution of acid and the dissolved earth constituents are drawn off, the remaining liquid being thoroughly washed out, and the remaining earthy material suitably dried. It may then be used in contact with any of the liquid substances referred to for filtering, decolorizing, purifying or otherwise acting thereon. Or, after the earthy material has been washed after acid treatment, it may be dried and again roasted or calcined, and thereafter for the first time used in contact with any of the liquid substances referred to. In either case, the acid treatment of the earth causes some of its constituent parts to be dissolved, while other constituents are disintegrated, with the result, however, that the efficiency of the earth remaining after washing away the acid solution and the disintegrated constituents is increased. The more important action of the acid is that the constituents dissolved or removed are largely the alkaline earths or alkaline earth metals and other constituents which induce, or lend themselves as fluxes in producing, fusion of the earth during the roasting or calcining treatment. The removal of such constituents has the result that in subsequent calcining or roasting treatments there is little or no fusion, and the efficiency of the earth is maintained or improved. By my acid treatment the temperature which the earth will withstand in roasting or calcining treatment without producing destructive or undesirable amount of fusion of the earth is raised considerably. In some cases I have found that the acid treatment raises this incipient fusion point to a good red heat, as distinguished from a dull red heat for untreated earth. The acid treatment therefore puts the earth in such condition that it materially resists fusion at the temperature of and at all temperatures lower than that reached in the roasting or calcining treatment. Or the raw earth, whether previously dried and granulated or not, may be subjected to the acid treatment without having been first calcined or roasted as above described. In such case, however, a large proportion of the earth disintegrates and becomes largely nothing but mud. The composition of the raw earth is such that its structure is largely destroyed or disintegrated when it is wetted with water or aqueous solution of acid. On the other hand, if the raw earth is first calcined or roasted, the heat causes changes in composition, such as driving off of water of constitution, and other changes, and the earth has then sufficient strength of structure to admit of treatment by acid solution without losing its desired granular form or porosity. However, I may, as stated, first treat the raw fullers' earth with aqueous solution of acid, thereby reducing a large proportion of it to structureless mud, and thereafter washing the mud away. The residue is then calcined or roasted, and such residue comprises material suitable for filtering, decolorizing or purifying oil or other liquid substance referred to.

Besides oils, such as mineral or petroleum oils, other materials in liquid or fluid state may be operated upon by the earth after the treatment hereinbefore described or after use upon oil or other liquid or after the revivifying or reclaiming treatment described in my aforesaid application, and particularly melted paraffin or other wax, or melted stearic acid may be so operated upon. And with respect to the use of the earth upon stearic acid, it is important that the earth shall have been treated with acid, since earth that has not been treated with acid will be attacked as to some of its constituents by the stearic acid, much in the manner of the mineral acid hereinbefore referred to, and the stearic acid by such attack itself becomes more or less neutralized or consumed.

In the accompanying drawing I have illustrated apparatus suitable for the hereinbefore described acid treatment of raw fullers' earth or for the acid treatment of fullers' earth which has been used in contact with oily liquid or any of the substances hereinbefore referred to.

In starting a treatment of the fullers' earth, acid is pumped by acid pump P through pipe 1 into the treating tank T. The acid so pumped may be weak acid from the weak acid tank A, this weak acid being left over from a prior treatment, or strong acid from the strong acid tank $A^1$, in which case the strong acid is diluted to the proper strength by mixture with weak acid or with water, the water being delivered by pump $P^1$ through pipes 2, 4, 5, 6, 7 and 9. The depth of the acid solution in the tank T is made sufficient to completely cover the amount of fullers' earth to be treated. The fullers' earth, preferably previously well washed and steamed if it has been used on oily liquid, is delivered by elevator E into the tank T. As it is being delivered into the acid solution in tank T the agitation of the mixture is begun and continued until all the fullers' earth of the treatment has been delivered into the acid solution, and thereafter as long as requisite.

Throughout the drawing the various valves are indicated by the reference character $v$. It will be understood that these valves may be opened and closed at will, to control delivery of the materials to the various parts of the apparatus at various times.

The agitation of the mixture above referred to is accomplished by the introduction of air or water through pipe 4 and flexible hose 5 to the T 6 with which the pipe 7, extending down into the tank T, has a revoluble air tight connection, a suitable ball-bearing for the pipe 7 and the parts attached thereto being provided at 8. At the lower end of the pipe 7 is attached the pipe 9, which may be curved, as shown, in conformity with the bottom of the tank T. This pipe 9 has a plurality of lateral perforations, these perforations on one side of the pipe 7 facing in one direction, and those on the other side of pipe 7 in another direction, so that when water or air under pressure is delivered through pipe 7 into pipe 9, the water or air escapes through these apertures and the reaction causes the pipe 9 with its attached pipe 7 to rotate, and during rotation communication is maintained with the pipe 4 through the T 6. This rotation of the pipe 9 agitates or mixes the material within the tank T, that is, the acid and fullers' earth by carrying around water or air in different parts of the tank T. The T 6 is attached to the chain or cord 11 which passes over the top of the derrick 12 to the windlass 13. By this windlass the pipe or agitator 9 may be elevated to different positions as occasion may require. In case air is to be passed through the pipes 7 and 9 the valve in pipe 14 leading to the air storage tank $A^2$ is opened, this tank $A^2$ being connected by pipe 15 with the air pump $P^2$. Steam admitted to tank T through pipe 3 raises the temperature of the mixture preferably to the boiling point. The agitation is kept up for a suitable length of time while the mixture is kept near or at the boiling point. The agitation may then be discontinued for a suitable length of time and repeated at intervals during the treatment. And throughout the treatment the mixture is kept at or near the boiling point as stated. When it is found that the acid ceases or nearly ceases to act, the operation of washing away the acid solution or acid solution and disintegrated material in the case of raw earth treatment is begun. For washing, water is forced by pump $P^1$ through pipes 2 and 4 into the tank T through pipe 9 until the latter is nearly filled. The contents of the tank are now thoroughly mixed, and the earth allowed to settle. The liquid in the tank is then drawn off through the valves and connections situated above the earth line in the tank, the liquid in this operation passing off through the draw off pipe 16. Preferably this liquid is delivered to the weak acid tank A, any surplus being discharged to the sewer through pipe 17. The washing is then continued by filling the tank T with water, mixing it well with the earth, and allowing the earth to settle, drawing off the water into the sewer through pipes 16 and 17. This washing is continued until the liquid discharged from the tank T is clear and free from acid. When the earth or earth residue has been satisfactorily washed, the mass is agitated while mixed with sufficient water to cause the mixture to readily flow through the bottom cock of tank T into the lower or drying tank or chamber $T^1$. The water of the mixture is now drained off through the bottom of tank $T^1$. Steam from the boiler B, super-heated in the super-heater S, is delivered into the tank $T^1$, now tightly closed at its top, through pipe 19. This steam is forced through the earth from above for the purpose of removing a portion of the water remaining in the earth and for heating the earth. When the earth has been so treated by steam and thoroughly heated throughout, compressed air, from tank $A^2$, heated in the super-heater S, is passed through pipe 20 into the tank $T^1$ through the earth. In this connection it will be understood that the tank $T^1$ is provided with a perforated false bottom 21 over which is placed a filter cloth of canvas or other suitable material, the steam or air current passing through the earth and out through the false bottom. When 30 Bé, acid and fifty tons of earth are used in the above-mentioned treatment, I have found that it requires approximately 96 hours' duration of contact between earth and acid and substantially 48 hours for the washing process before the earth is ready for the drier $T^1$. The raw or previously used earth having been treated and dried as above described, it is removed from the tank $T^1$ and further dried, roasted or calcined, as in kilns and is then in condition for treatment of oil or liquid as hereinbefore described.

What I claim is:

1. The method of preparing a residue of raw fullers' earth or earthy material of similar characteristics for filtering, decolorizing or purifying liquid, which consists in treating raw fullers' earth or earthy material with acid which dissolves or extracts ingredients of said earth or earthy material tending to produce fusion, and thereafter washing the same and separating therefrom the disintegrated structureless portion thereof.

2. The method of preparing a residue of raw fullers' earth or earthy material of similar characteristics for percolation of oily liquid therethrough, which consists in treating raw fullers' earth or earthy material with acid which dissolves or extracts ingredients of said earth or earthy material tending to produce fusion, and thereafter washing the same and separating therefrom the disintegrated structureless portion thereof.

3. The method of preparing a residue of raw fullers' earth or earthy material of similar characteristics for filtering, decolorizing or purifying liquid, which consists in treating raw fullers' earth or earthy material with acid which dissolves or extracts ingredients tending to produce fusion, thereafter separating therefrom the disintegrated structureless portion of said fullers' earth or earthy material, and calcining or roasting the residue.

4. The method of preparing a residue of raw fullers' earth or earthy material of similar characteristics for percolation of oily liquid therethrough, which consists in treating raw fullers' earth or earthy material with acid which dissolves or extracts ingredients tending to produce fusion, thereafter separating therefrom the disintegrated structureless portion of said fullers' earth or earthy material, and calcining or roasting the residue.

5. The method of preparing raw fullers' earth or earthy material of similar characteristics for filtering, decolorizing or purifying liquid, which consists in calcining or roasting raw fullers' earth or earthy material, and thereafter treating the same with acid which dissolves or extracts ingredients tending to produce fusion.

6. The method of preparing raw fullers' earth or earthy material of similar characteristics for percolation of oily liquid therethrough, which consists in calcining or roasting raw fullers' earth or earthy material, and thereafter treating the same with acid which dissolves or extracts ingredients tending to produce fusion.

7. The method of preparing raw fullers' earth for percolation of petroleum oil therethrough, which consists in calcining or roasting raw fullers' earth, and thereafter treating the same with mineral acid to extract or dissolve ingredients tending to produce fusion.

8. The method of preparing raw fullers' earth or earthy material of similar characteristics for action upon oily liquid, which consists in calcining or roasting raw fullers' earth or earthy material, treating the calcined or roasted earth with acid which dissolves or extracts ingredients tending to produce fusion, and thereafter calcining or roasting the earth.

9. The method of preparing raw fullers' earth or earthy material of similar characteristics for action upon oily liquid, which consists in calcining or roasting raw fullers' earth or earthy material, treating the calcined or roasted earth with acid which dissolves or extracts ingredients tending to produce fusion, and thereafter drying the earth.

10. A material for filtering, decolorizing or purifying oily liquid consisting of the residue of raw fullers' earth remaining after extraction therefrom of constituents inducing fusion in calcining or roasting.

11. A material for filtering, decolorizing or purifying oily liquid consisting of the residue of raw fullers' earth remaining after extraction therefrom of constituents inducing fusion in calcining or roasting and after separation therefrom of the disintegrated structureless portion thereof.

12. A material for filtering, decolorizing or purifying oily liquid consisting of the calcined or roasted residue of raw fullers' earth remaining after extraction therefrom of constituents inducing fusion.

13. A material for filtering, decolorizing or purifying liquid consisting of the calcined or roasted residue of raw fullers' earth remaining after extraction therefrom of constituents inducing fusion and separation therefrom of the disintegrated structureless portion thereof.

In testimony whereof I have hereunto affixed my signature in the presence of the two subscribing witnesses.

MICHAEL J. WELSH.

Witnesses:
CHARLES E. WAITE,
E. B. HENRY.